US008457937B2

(12) United States Patent
Sinha et al.

(10) Patent No.: US 8,457,937 B2
(45) Date of Patent: Jun. 4, 2013

(54) METHOD OF OPTIMIZING VOLUME UTILIZATION OF AN AUTOCLAVE

(75) Inventors: Shatil Sinha, Niskayuna, NY (US);
Ram Upadhyay, Niskayuna, NY (US);
Nicholas Kray, Blue Ash, OH (US);
Jian Mi, Niskayuna, NY (US); Thomas Lednicky, Austin, TX (US)

(73) Assignee: General Electric Company, Niskayuna, NY (US)

( * ) Notice: Subject to any disclaimer, the term of this patent is extended or adjusted under 35 U.S.C. 154(b) by 216 days.

(21) Appl. No.: 12/983,566

(22) Filed: Jan. 3, 2011

(65) Prior Publication Data

US 2012/0173203 A1 Jul. 5, 2012

(51) Int. Cl.
*G06G 7/48* (2006.01)

(52) U.S. Cl.
USPC .................................................. 703/6

(58) Field of Classification Search
USPC .................................................. 703/6
See application file for complete search history.

(56) References Cited

U.S. PATENT DOCUMENTS

| | | | | |
|---|---|---|---|---|
| 5,453,226 A * | 9/1995 | Kline et al. | ........... | 264/40.1 |
| 6,240,333 B1 | 5/2001 | McGee | | |
| 6,725,183 B1 * | 4/2004 | Cawse | ........... | 703/2 |
| 6,755,929 B2 * | 6/2004 | Sun et al. | ........... | 156/212 |
| 6,872,918 B2 | 3/2005 | Toll | | |
| 2003/0162466 A1 * | 8/2003 | King | ........... | 445/25 |
| 2008/0308224 A1 | 12/2008 | Barmichev et al. | | |
| 2010/0038030 A1 | 2/2010 | Allen et al. | | |

OTHER PUBLICATIONS

Antonucci et al.; A new methodology for the active control of the heat transfer in Autoclave technology; European Symposium on Computer Aided Process Engineering—I0 Pierucci (Editor); 2000; pp. 295-300.*
Slesinger et al.; Heat Transfer Coefficient Distribution Inside an Autoclave; May 10, 2009 ICCM17; May 2009; pp. 1-10.*
Berenberg, "Precision Process Controls Optimize Quality of Autoclave-cured Parts", High-Performance Composites, Mar. 2003, pp. 1-4.

* cited by examiner

*Primary Examiner* — Hugh Jones
(74) *Attorney, Agent, or Firm* — John P. Darling

(57) ABSTRACT

A method of optimizing an autoclave volume utilization includes, in an exemplary embodiment, determining process parameters of an autoclave; modeling an autoclave configuration to determine airflow patterns in the autoclave, temperature variation throughout the autoclave, and the distribution of turbulent intensity in the autoclave; and modifying the autoclave configuration with hardware changes to the autoclave to alter the airflow patterns in the autoclave. The method also includes modeling the modified autoclave configuration to determine modified airflow patterns in the autoclave, modified temperature variation throughout the autoclave, and the modified distribution of turbulent intensity in the autoclave; and modeling the modified autoclave configuration with parts to be cured in the modified autoclave configuration to determine an arrangement of parts that maximizes the number of parts in the autoclave that meet predetermined cured properties of the parts.

14 Claims, 13 Drawing Sheets so that during the
cure cycle it is not feasible to view or sense what's happening
to the air flow very easily.

METHOD OF OPTIMIZING VOLUME UTILIZATION OF AN AUTOCLAVE

BACKGROUND OF THE INVENTION

The field of the invention relates generally to autoclaves, and more particularly, to optimizing an autoclave volume utilization for quality sensitive high performance composite component parts.

Composite materials have a wide variety of commercial and industrial uses, ranging from aircraft, automobile, turbines and computer parts. Composite materials have many advantages which make them attractive to different industries. For instance, composite materials can reduce heat transfer, resist conduction of electricity, are flexible but strong, and can be fairly easily formed into complex shapes during manufacturing. Some examples of commercial applications include the complex shapes of certain automobiles, airplanes, boats, and turbines which would be difficult to form with metal materials.

Curing high quality polymer matrix composite components in an autoclave is a common practice. An autoclave provides a curing temperature and high pressure capability to produce quality parts. However, an autoclave poses an inherent problem that the autoclave is controlled by one pressure, temperature and vacuum cycle. Due to thermal variations inside the autoclave, the curing of parts positioned at various locations in the autoclave may not be within quality requirements. Because of the non-uniform temperature in the autoclave, parts are generally are not positioned in areas of too low or high temperature which limits the amount of usable volume of the autoclave. In addition, the autoclave is typically run at a high temperature and high pressure, so that during the cure cycle it is not feasible to view or sense what's happening to the air flow very easily.

BRIEF DESCRIPTION OF THE INVENTION

In one aspect, a method of optimizing an autoclave volume utilization is provided. The method includes determining process parameters of an autoclave; modeling an autoclave configuration to determine airflow patterns in the autoclave, temperature variation throughout the autoclave, and the distribution of turbulent intensity in the autoclave; and modifying the autoclave configuration with hardware changes to the autoclave to alter the airflow patterns in the autoclave. The method also includes modeling the modified autoclave configuration to determine modified airflow patterns in the autoclave, modified temperature variation throughout the autoclave, and the modified area of turbulent intensity in the autoclave; and modeling the modified autoclave configuration with parts to be cured in the modified autoclave configuration to determine an arrangement of parts that maximizes the number of parts in the autoclave that meet predetermined cured properties of the parts.

In another aspect, a method of optimizing an autoclave volume utilization is provided. The method includes determining process parameters of an autoclave; modeling an autoclave configuration to determine airflow patterns in the autoclave, temperature variation throughout the autoclave, and the distribution of turbulent intensity in the autoclave; and modifying the autoclave configuration by positioning a diffusion screen in the autoclave to alter the airflow patterns in the autoclave. The method also includes modeling the modified autoclave configuration to determine modified airflow patterns in the autoclave, modified temperature variation throughout the autoclave, and the modified area of turbulent intensity in the autoclave; and modeling the modified autoclave configuration with parts to be cured in the modified autoclave configuration to determine an arrangement of parts that maximizes the number of parts in the autoclave that meet predetermined cured properties of the parts.

DETAILED DESCRIPTION OF THE INVENTION

A method of optimizing volume utilization of an autoclave is described in detail below. Volume optimization increases the curing capacity of the autoclave which results in a cost reduction of making polymer matrix composite parts or components. Because of temperature variation throughout the autoclave, parts are not positioned in the low or high temperature areas (temperatures below or above the desired curing temperature) of the autoclave, and thus the total available volume of the autoclave is not used. The method provides for an increase in the number of parts cured at one time that meet quality requirements, for an improvement in the yield of the autoclave, for reduced costs, and for increased capacity which could avoid costly capital investments. In addition, the designed hardware changes can be made in an existing autoclave, which also would avoid the capital investment for a new autoclave.

Figure 1:
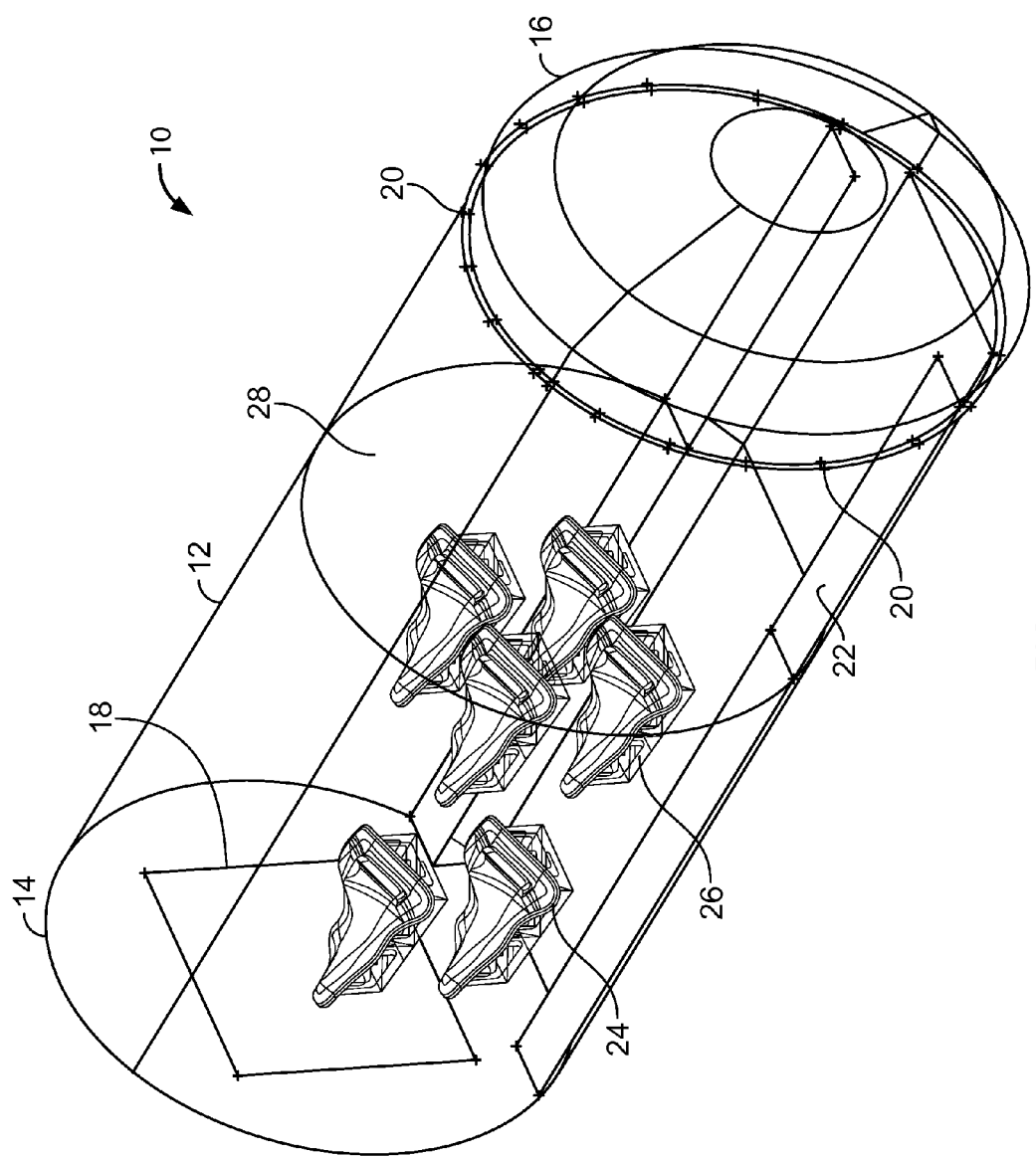
FIG. 1 is a three dimensional schematic illustration of an exemplary autoclave.

Referring to the drawings, FIG. 1 is a plan schematic illustration of an autoclave 10. In the exemplary embodiment, autoclave 10 includes a cylindrical heating container 12. An end wall 14 is located at one end of cylindrical container 12, and a door 16 is located at an opposite end of cylindrical container 12. End wall 14 includes an air exit outlet 18, and door 16 includes a plurality of air inlets 20 around the circumference of door 16. Hot air enters cylindrical container 12 through air inlets 20 and exits through exit outlet 18. A fan (not shown) is used to move the hot air through air inlets 20. A catwalk 22 is located on the bottom of cylindrical container 12 to permit workers to walk into cylindrical container 12 for loading parts, removing parts, and for performing maintenance. FIG. 1 also shows parts 24 supported by tools and substructures 26 and positioned inside the volume 28 of cylindrical heating container 12.

Figure 2:
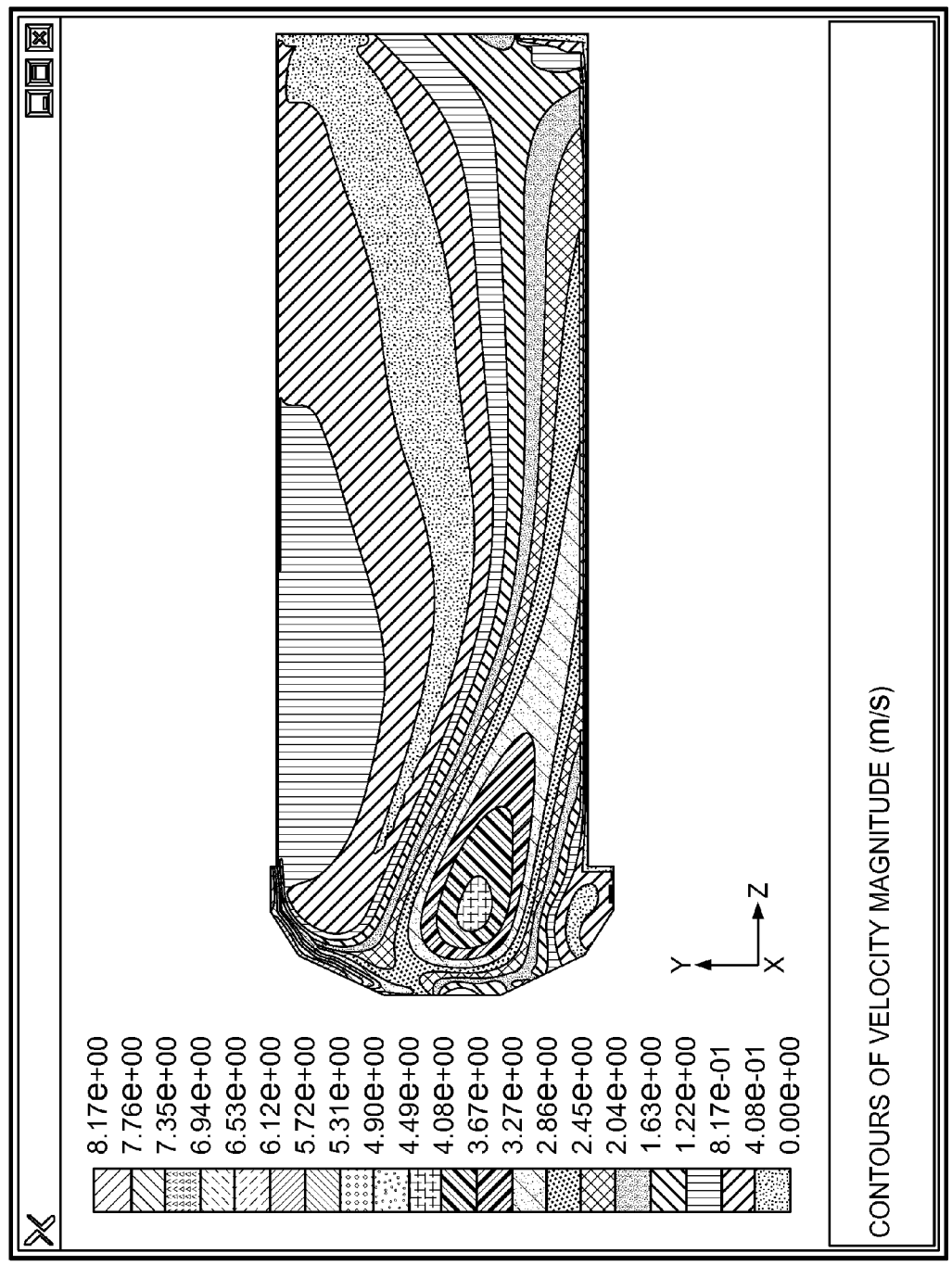
FIG. 2 is an illustration of a representation of the velocity patterns in the Y-Z plane of the autoclave shown in FIG. 1.
Figure 3:
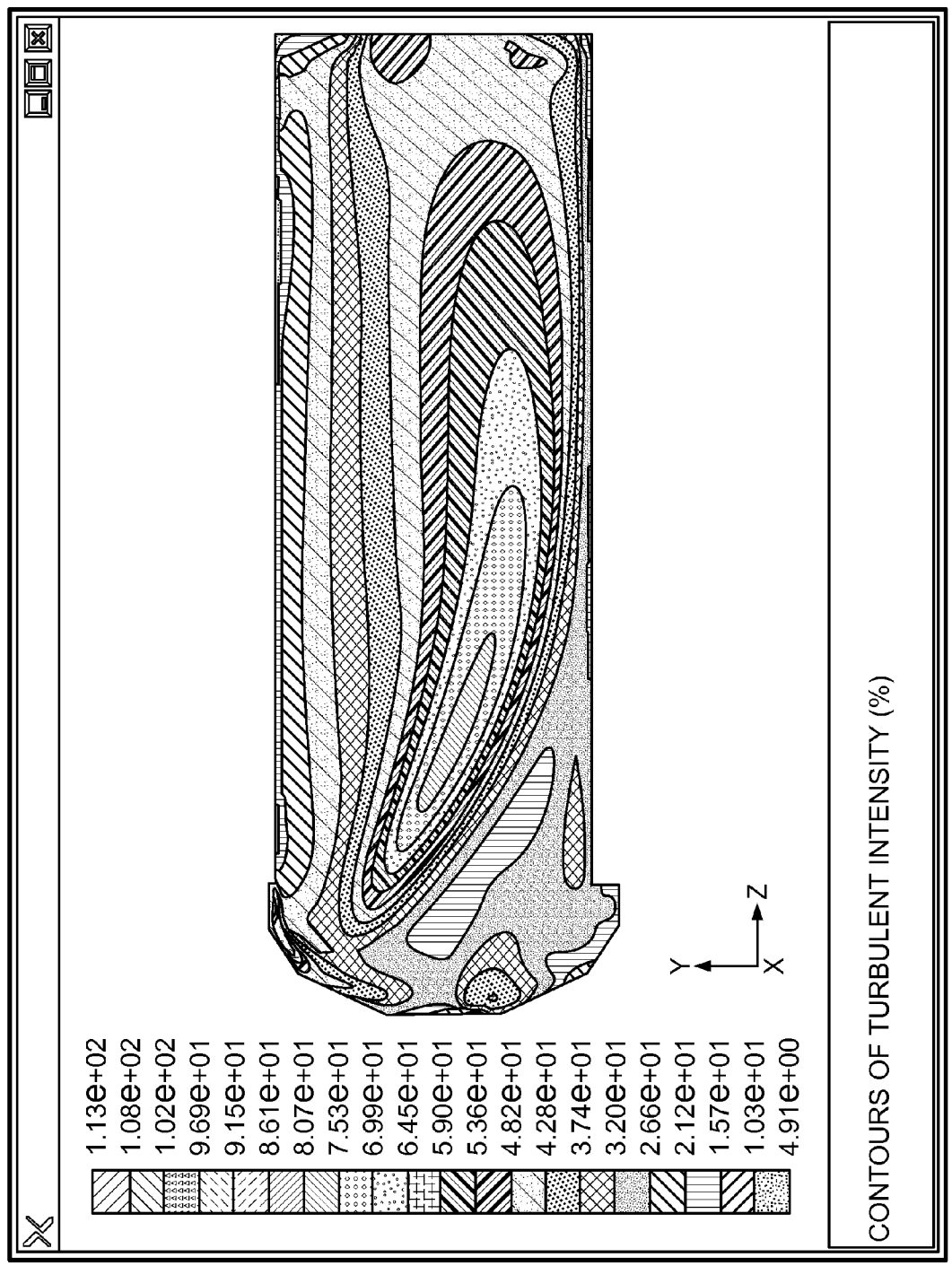
FIG. 3 is an illustration of a representation of the turbulence intensity patterns in the Y-Z plane of the autoclave shown in FIG. 1.
Figure 4:
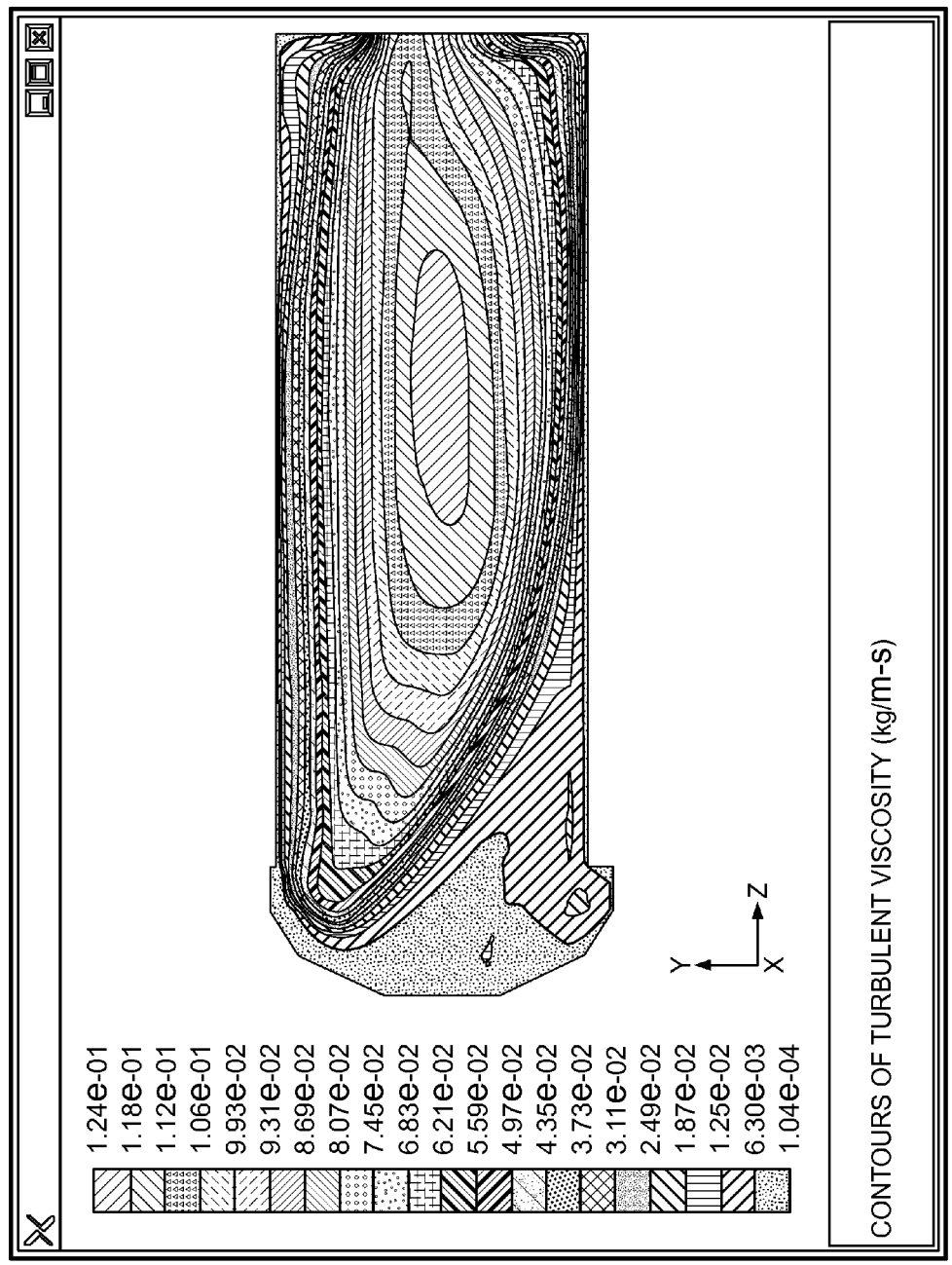
FIG. 4 is an illustration of a representation of the turbulence viscosity patterns in the Y-Z plane of the autoclave shown in FIG. 1.

To optimize the utilization of the volume of autoclave 10, a modeling program is used to model the configuration of autoclave 10. In the exemplary embodiment, a three dimensional computational fluid dynamics (CFD) modeling program is used to model autoclave 10 and produce a model of airflow patterns, temperature variations throughout cylindrical container 12, and turbulent intensity patterns in cylindrical container 12. To model autoclave 10, the process parameters of autoclave 10 are determined and used in the CFD modeling program. Process parameters may include, but are not limited to, diameter of cylindrical container 12, length of cylindrical container 12, diameter of air inlet 20, fan speed, operating pressure, air temperature, inlet flow rates, and the like. FIG. 2 shows a representation of the velocity patterns in the Y-Z plane of autoclave 10, FIG. 3 shows a representation of the turbulence intensity patterns in the Y-Z plane of autoclave 10, and FIG. 4 shows a representation of the turbulence viscosity patterns in the Y-Z plane of autoclave 10.

Inlet flow rates may be acquired on an open autoclave with a simple flow measurement tool. The measurements are done at multiple locations of the inlet and then converted to an appropriate turbulent boundary condition. This methodology may be used to improve the fidelity of the CFD model.

Figure 5:
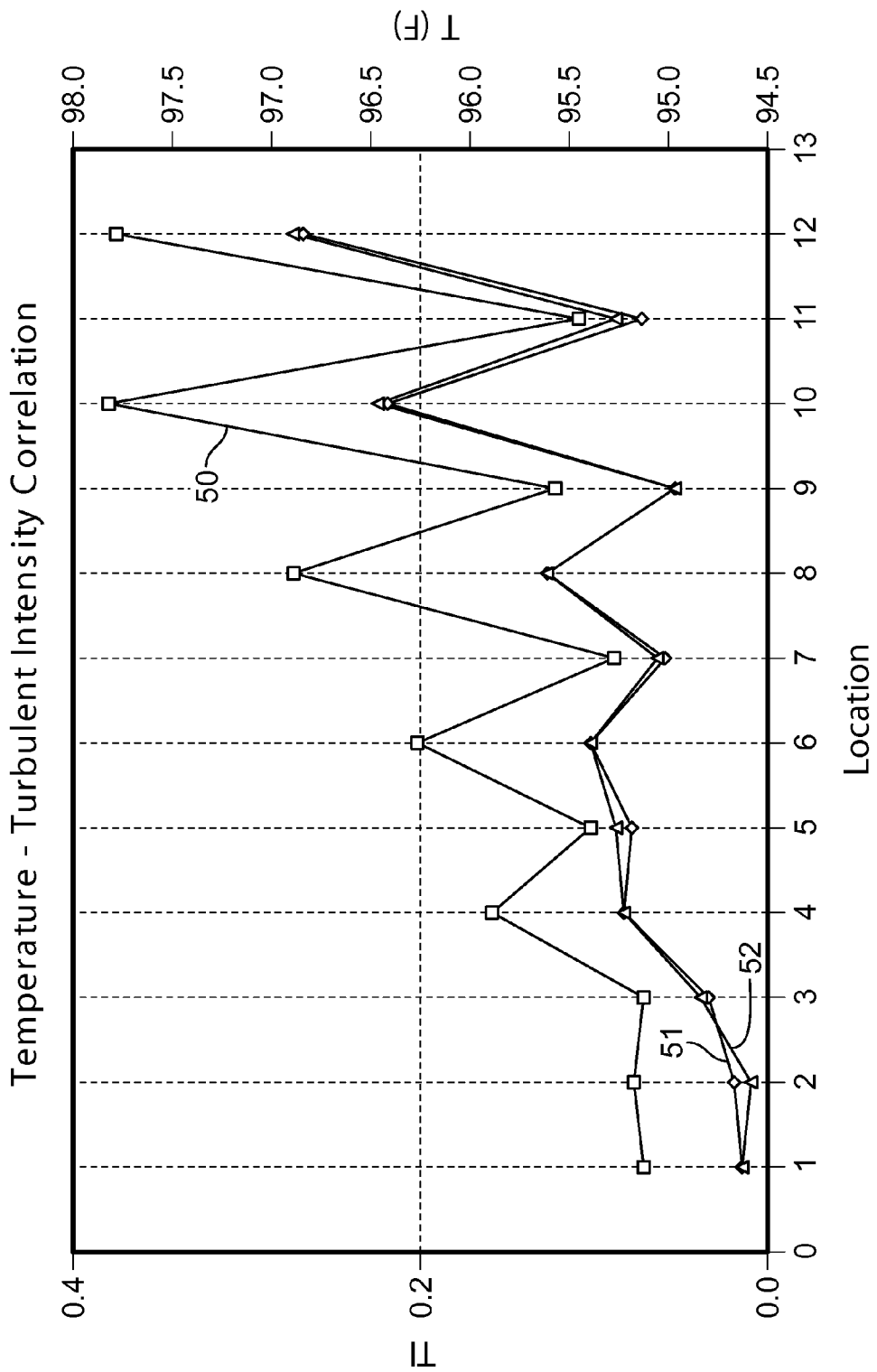
FIG. 5 is a graft showing the correlation of temperature and turbulent intensity.
Figure 6:
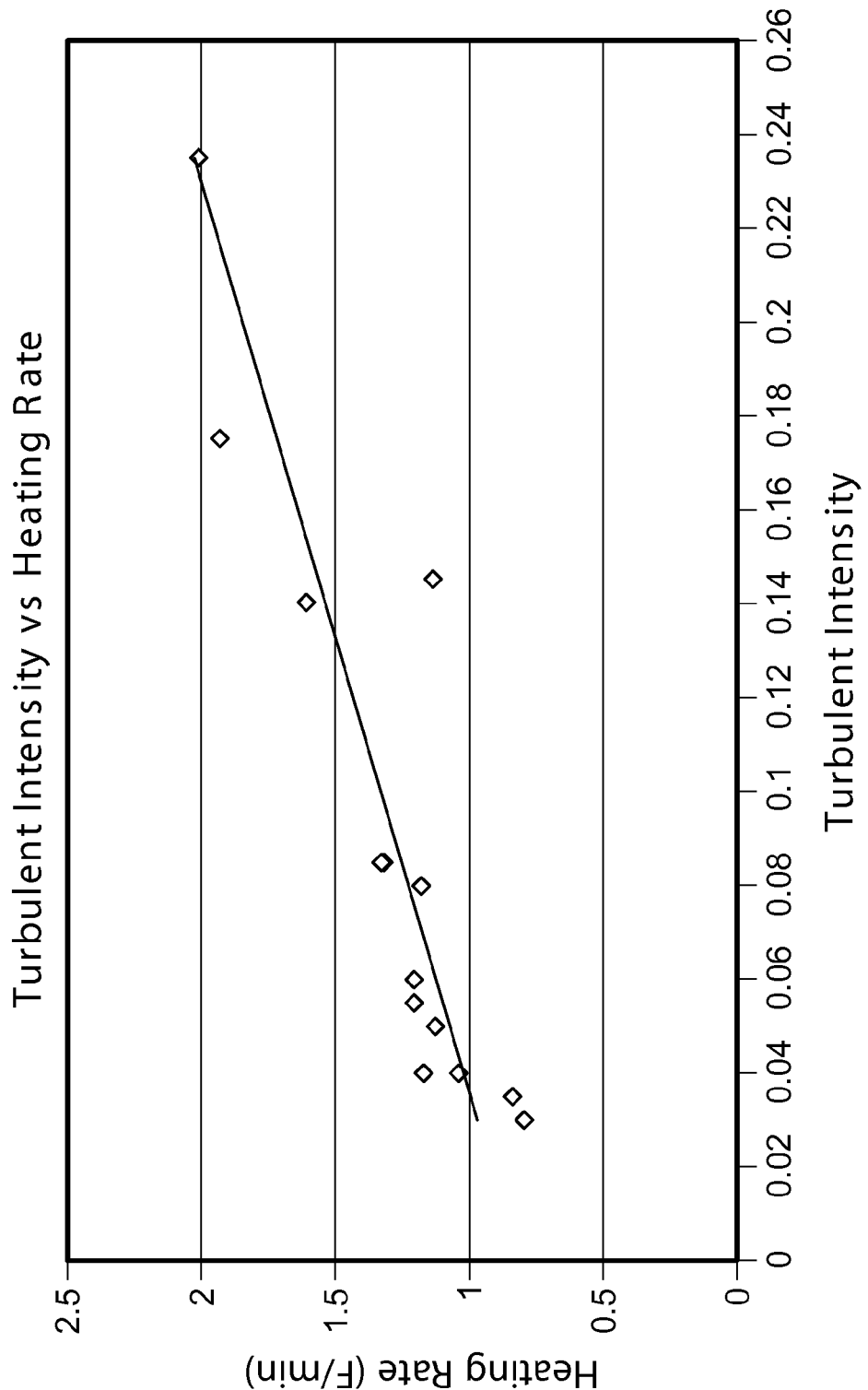
FIG. 6 is a graph of turbulent intensity versus heating rate that shows the correlation between turbulent intensity and heating rate.

It was found that turbulent intensity from a steady state model run can be used as a good indicator for temperature variability. FIG. 5 is a graph of temperature and turbulent intensity. Line 50 shows the temperature at different locations in autoclave 10, and lines 51 and 52 show the turbulent intensity at the same locations in autoclave 10. The graph in FIG. 5 shows the correlation of temperature and turbulent intensity, and that the turbulent intensity does not change much between steady state and transient analysis. In addition, turbulent intensity also tracks the heating rate in autoclave 10. FIG. 6 is a graph of turbulent intensity versus heating rate that shows the correlation between turbulent intensity and heating rate.

Inlet velocity is also an important process parameter in modeling flows through autoclave 10. In an example, inlet velocity was measured at each inlet location. The Reynolds Number at an inlet is calculated by the equation:

$Re = \rho v L / \mu$, where

L=duct diameter=0.0635 m (2.5 in),
$\rho$=Nitrogen Density=1.138 kg/m³,
$V_{max}$=Highest Measured Inlet Velocity=8.3312 m/s (1640 fpm),
$V_{min}$=Lowest Measured Inlet Velocity=0.4064 m/s (80 fpm),
$Re_{max}$=36,200, and
$Re_{min}$=1,765.

Turbulent intensity (I) at the core of a fully-developed duct flow can be estimated from the following formula derived from an empirical correlation for pipe flows: $I=0.16(Re)^{-1/8}$. To calculate the maximum turbulent intensity, $I_{max}$, the $Re_{max}$ number described above is used. Therefore, $I_{max}$ is calculated as 0.0431, or 4.31%. In addition, turbulent kinetic energy can be estimated from the turbulence intensity. The relationship between the turbulent kinetic energy, K, and turbulence intensity $I_{max}$ is calculated by the formula: $K=3/2(V_{max}I_{max})^2$. Using the $V_{max}$ and $I_{max}$ calculated above, K is calculated as 0.1934 m²/s².

Turbulence length scale, l, is a physical quantity related to the size of the large eddies that contain the energy in turbulent flows. In fully-developed duct flows, l is restricted by the size of the duct, because the turbulent eddies cannot be larger than the duct. An approximate relationship between l and the physical size of the duct is: l=0.07 L. Using the duct diameter, L, described above, turbulence length scale, l, is calculated as 0.004445 m. Turbulent dissipation rate ($\epsilon$) may be estimated from a length scale, l, from the relationship: $\epsilon=(C_\mu)^{3/4}(K^{3/2})/l$, where $C_\mu$ is an empirical constant of about 0.09. Using the turbulent kinetic energy, K, and the turbulent length scale, l, calculated above, $\epsilon$ is calculated as 3.1441 m²/s².

Figure 7:
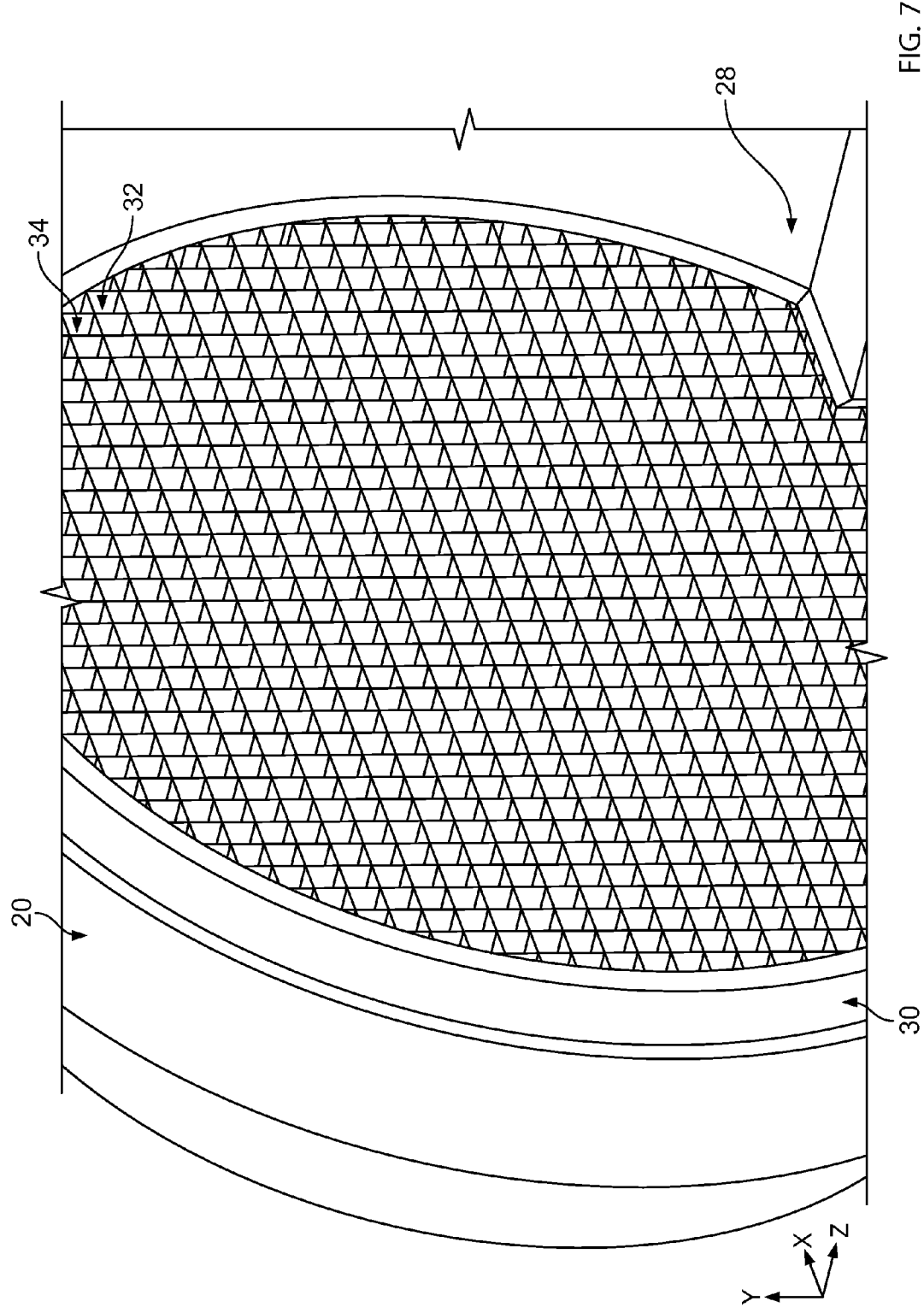
FIG. 7 shows a three dimensional view of a diffusion screen.

Referring to FIG. 7, autoclave 10 may be modified with hardware changes to alter airflow patterns and thermal intensity patterns. Some example modifications include, but are not limited to, adding a diffusion screen 30 between air inlets 20 and interior volume 28 of cylindrical heating container 12, adding baffles in the autoclave, changing tool configurations, adding insulation between a part and a tool, changing fan speed, and the like. In an exemplary embodiment, a diffusion screen 30 is positioned between air inlets 20 and interior volume 28 of cylindrical heating container 12 in autoclave 10. Diffusion screen 30 includes a screen grid 32 having a plurality of rectangular shaped openings 34 or a plurality of polygon shaped openings. Screen grid 32 is three dimensional and has a perimeter to depth ratio of about 1.5:1 to about 2:1. For example, in a screen grid having a plurality of square openings having sides of four inches each and a depth of 8 inches, the perimeter to depth ratio would be 2:1.

Figure 8:
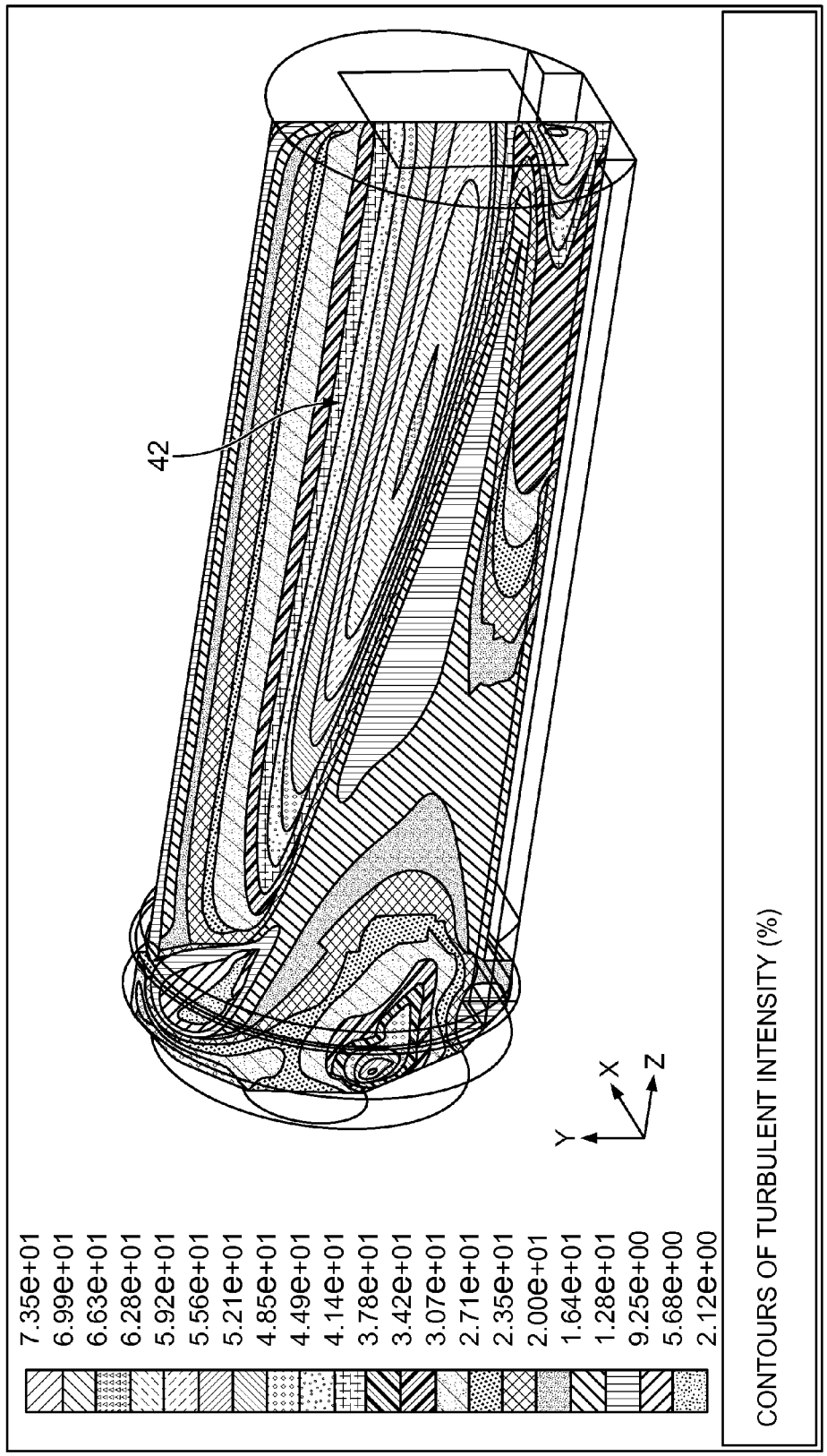
FIG. 8 shows a three dimensional representation of turbulence intensity patterns in the autoclave shown in FIG. 1 without a diffusion screen.
Figure 9:
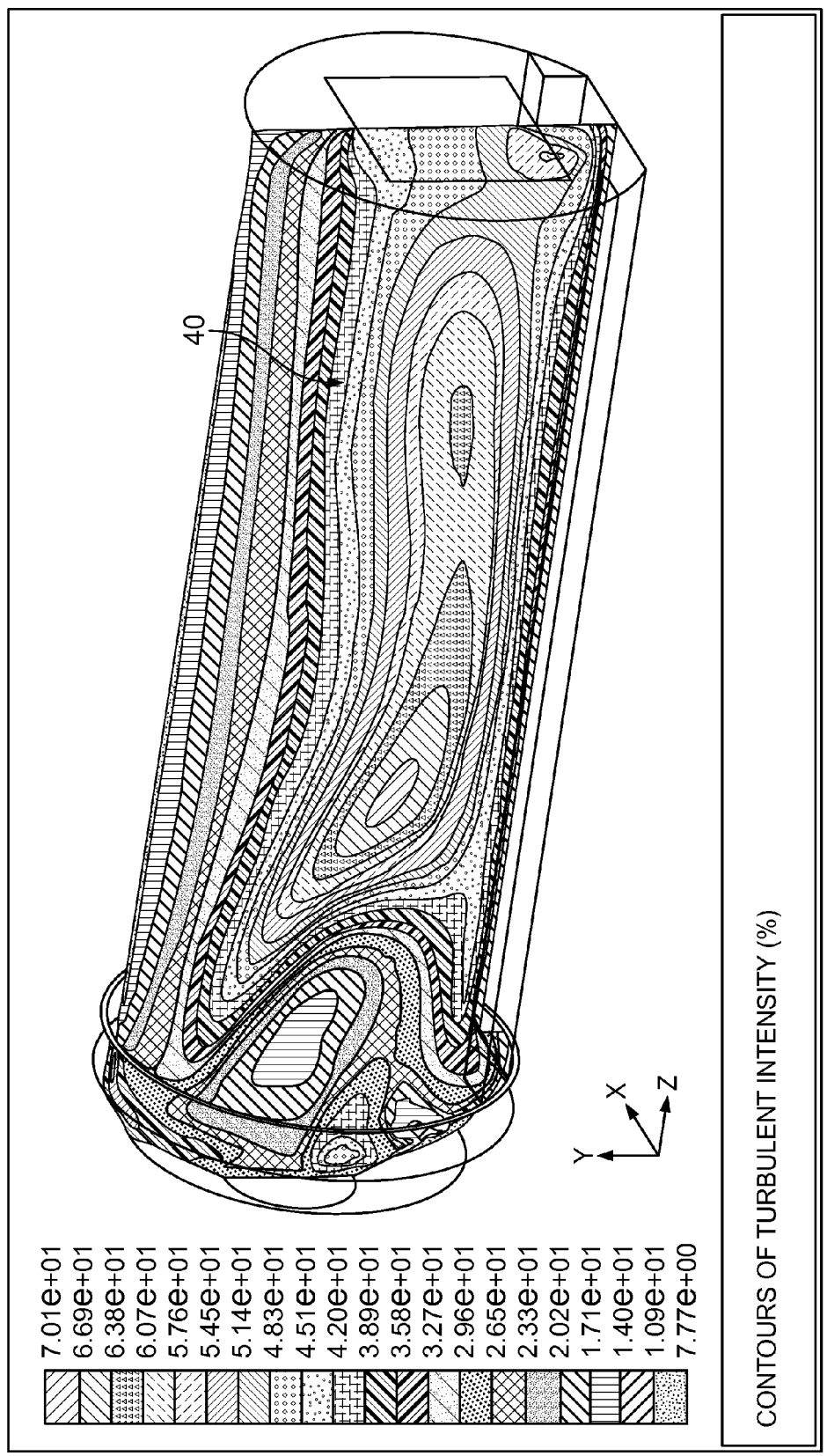
FIG. 9 shows a three dimensional representation of turbulence intensity patterns in the autoclave shown in FIG. 1 modified with a diffusion screen.

Autoclave 10 with the addition of diffusion screen 30 is again modeled with CFD modeling program to produce a model of modified airflow patterns, modified temperature variations throughout cylindrical container 12, and modified turbulent intensity patterns in cylindrical container 12. FIG. 8 shows a three dimensional representation of the turbulence intensity patterns in autoclave 10 without diffusion screen 30, and FIG. 9 shows a three dimensional representation of the turbulence intensity patterns in autoclave 10 that includes diffusion screen 30. A high turbulence intensity pattern 40 in FIG. 9 is larger than a high turbulence intensity pattern 42 in FIG. 8. The larger area of high turbulence intensity pattern 40 provides for a larger portion of the volume of cylindrical heating container 12 in which parts can be positioned where the temperatures will be closer than parts positioned outside high turbulence intensity pattern 40. Autoclave 10 is again modeled with parts positioned in autoclave 10 using a CFD modeling program to produce a model of airflow patterns, temperature variations throughout cylindrical container 12, and turbulent intensity patterns in cylindrical container 12. These models of airflow patterns, temperature variations, and turbulent intensity patterns take into account the shape and size of each part in autoclave 12 and permit one to determine the best location for each part so as to maximize the number of parts that will meet the desired cure properties.

The models of airflow patterns, temperature variations, and turbulent intensity patterns may be validated by running tests in autoclave 10 using a numerical design of experiment (DOE) technique. One test includes using metal blocks, with thermocouples attached, as a simulation of actual parts. The metal blocks are positioned in autoclave 10, and temperatures of each block are monitored during a typical curing cycle. The temperatures of each block during the curing cycle shows the heating rate at each position and the time duration of a desired temperature at each point. The test results are compared to the model results to validate the model.

Another test includes positioning actual parts in autoclave 10, running a curing cycle, and monitoring the temperature of each part. The results of the tests are used to validate the CFD model for autoclave 10. Once the model is validated, various arrangements of parts in autoclave 10 are analyzed to maximize the arrangement of parts in autoclave 10. For an example, a test for optimizing the arrangement of parts to maximize the number of parts in autoclave 10 was performed using 16 turbine blades. The blades were positioned throughout autoclave 10, a cure cycle was run, and the temperature of each blade was monitored during the cure cycle. A plurality of analyses runs were performed with the blades being repositioned in each run. The blades were repositioned forward, backward, up or down for each cure cycle run as indicated by a numerical design of experiment. The results from the DOE tests indicated an optimized arrangement of blades in autoclave 10. The results showed that the temperatures of the root of the blades were close to each other, and had a maximum difference between the low temperature and the high temperature of about 25.4° F. In addition, the temperatures of the tips of the blades were close to each other, and that the temperatures of the tips of the blades had a maximum difference between the low temperature and the high temperature of about 16.4° F. A general methodology was developed to assess an autoclave by modeling the empty autoclave first and evaluating turbulent intensity and velocity distribution in 3D to assess the options of parts placement without any hardware modification followed by concepts development to optimize the volume utilization.

Figure 10:
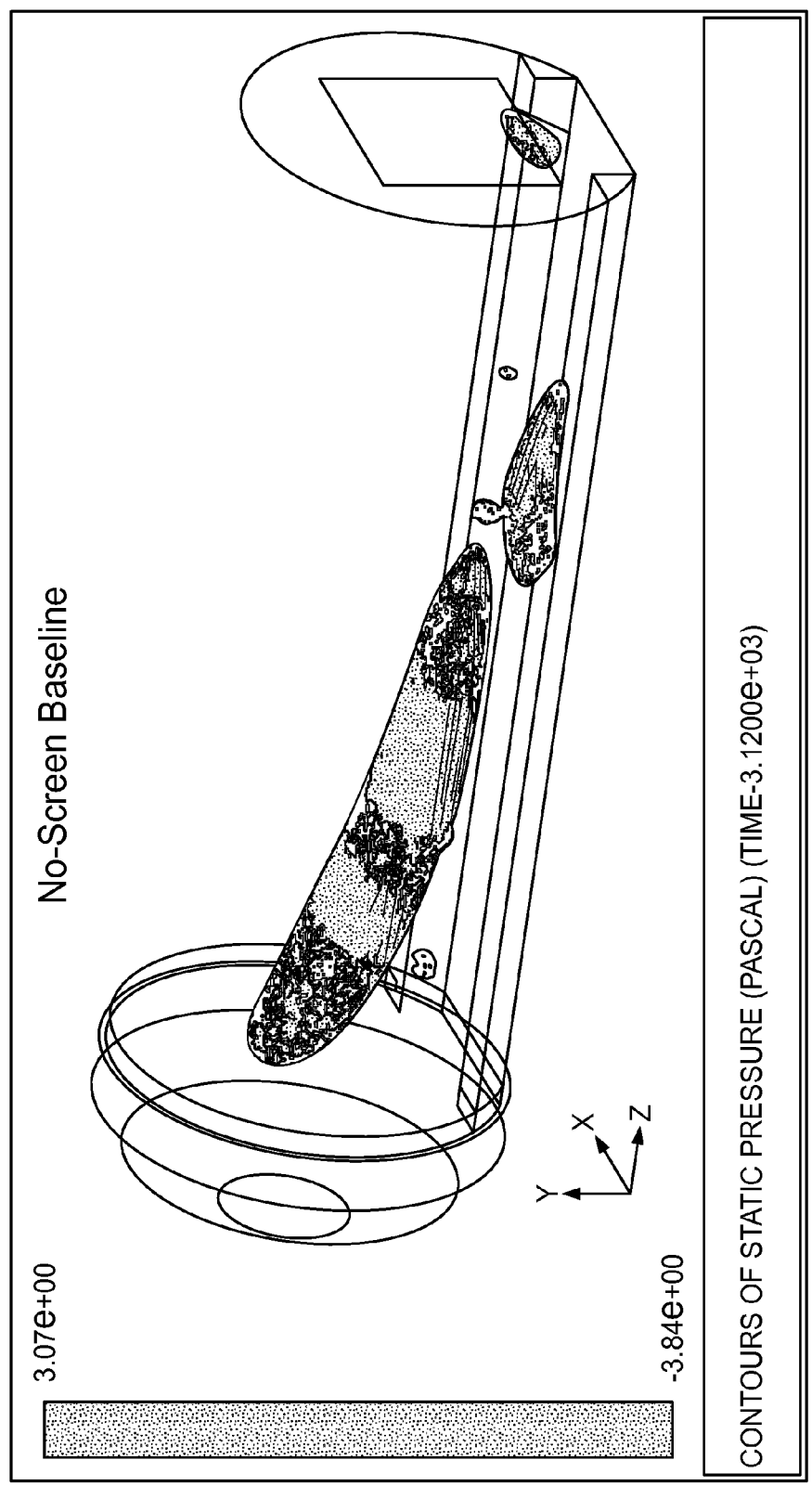
FIG. 10 shows an iso-surface for 60% turbulent intensity for an autoclave without a screen.
Figure 11:
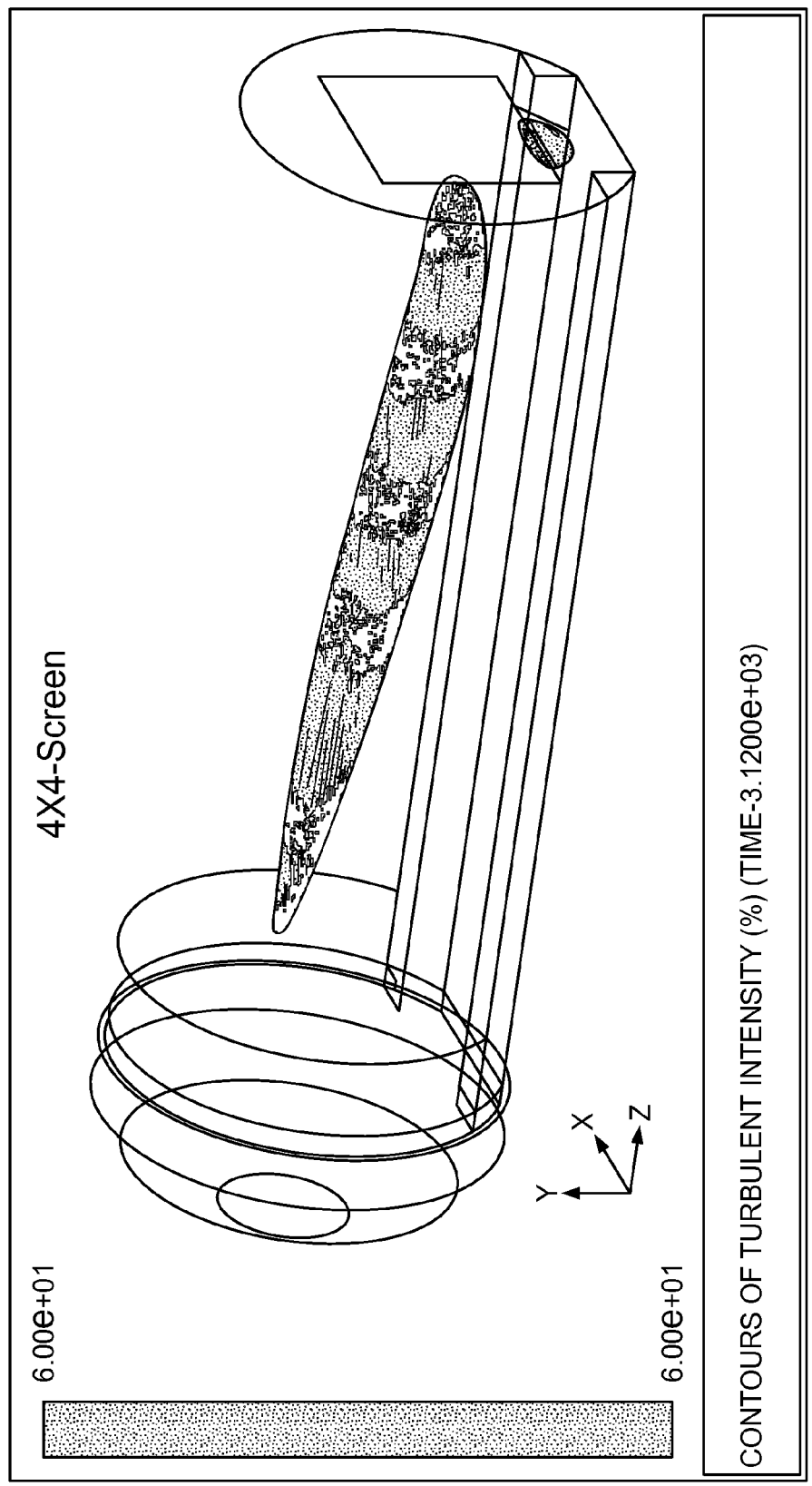
FIG. 11 shows an iso-surface for 60% turbulent intensity for an autoclave with a 4×4 diffusion screen.
Figure 12:
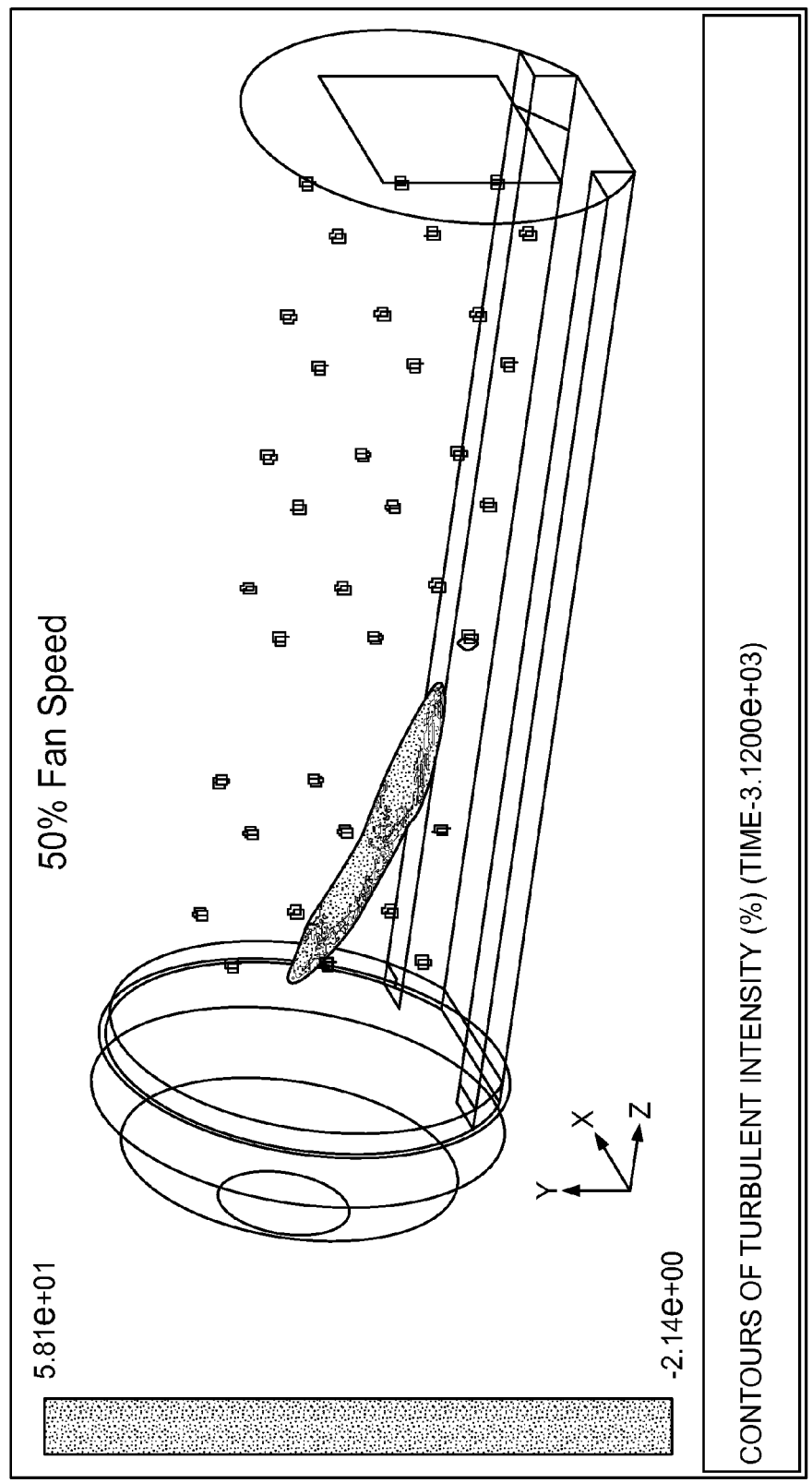
FIG. 12 shows an iso-surface for 60% turbulent intensity for an autoclave with a 50% fan speed reduction.
Figure 13:
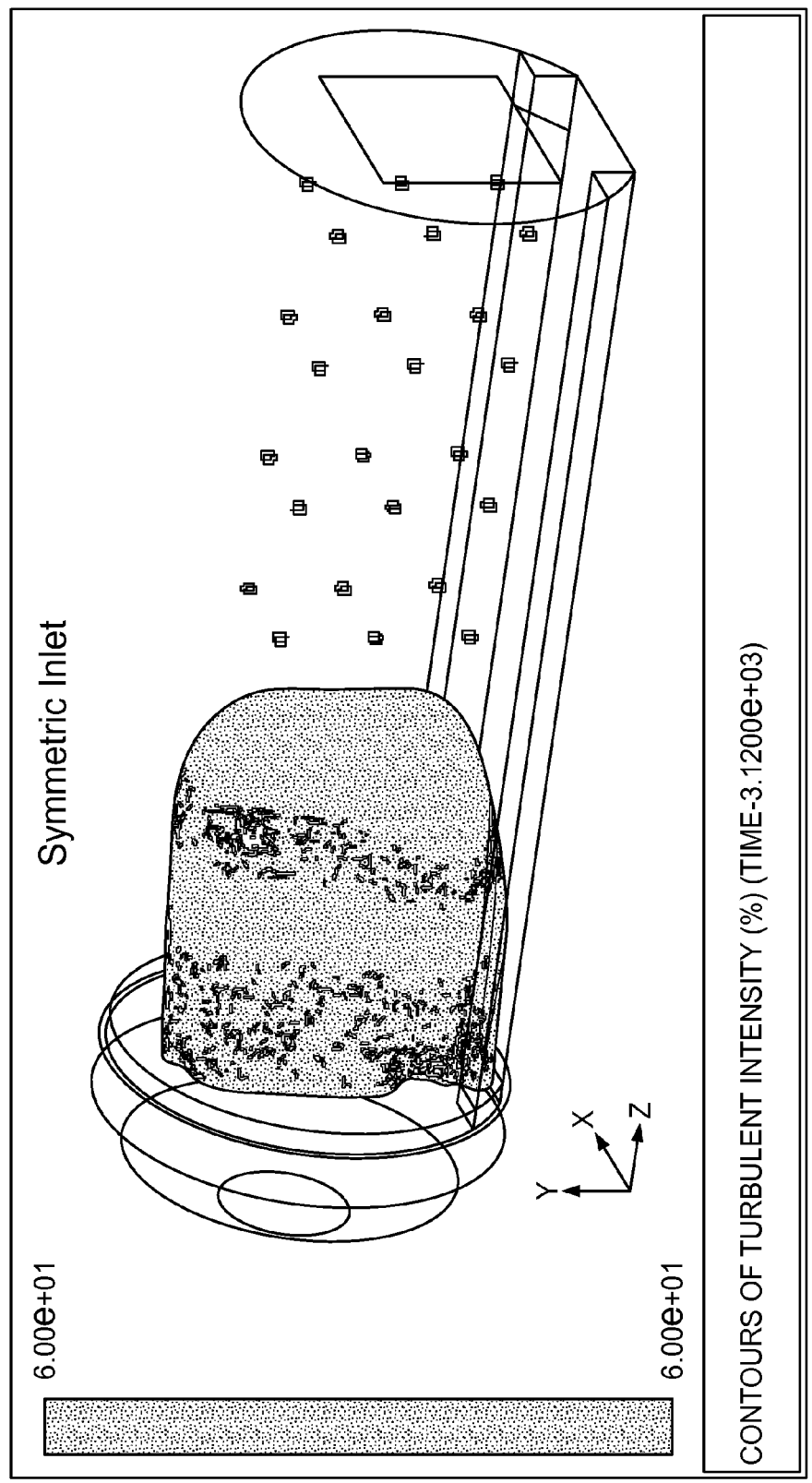
FIG. 13 shows an iso-surface for 60% turbulent intensity for an autoclave with a symmetric inlet.

Other concepts besides adding diffusion screen 30 to autoclave 10 may also be used. For example, reducing the speed of the fan by 50%, or some other percentage, and providing a symmetric inlet. FIG. 10 shows an iso-surface for 60% turbulent intensity for an autoclave with no screen (baseline). FIG. 11 shows an iso-surface for 60% turbulent intensity for an autoclave with a 4×4 diffusion screen. FIG. 12 shows an iso-surface for 60% turbulent intensity for an autoclave with a 50% fan speed reduction. FIG. 13 shows an iso-surface for 60% turbulent intensity for an autoclave with a symmetric inlet. Steel blocks were positioned within the autoclave to monitor temperatures throughout the autoclave. With a 50% reduction in fan speed, the 60% turbulent intensity pattern was much smaller than the 60% turbulent intensity pattern of the baseline autoclave which resulted to a smaller difference between the low temperature and the high temperature of the blocks. For the symmetric inlet, the top inlet of the autoclave was blocked to make the flow symmetric. The 60% turbulent intensity pattern for the symmetric inlet concept was a large area of the volume of the front of the volume. The difference between the low temperature and the high temperature of the blocks was very high. The 60% turbulent intensity pattern for the screen concept was larger than the baseline autoclave, but the intensity pattern extended the length of the autoclave. The difference between the low temperature and the high temperature of the blocks was less than the difference in the baseline autoclave, but higher than difference in the 50% fan speed reduction concept.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of optimizing an autoclave volume utilization, said method comprises:
    determining process parameters of an autoclave;
    modeling an autoclave configuration to determine airflow patterns in the autoclave, temperature variation throughout the autoclave, and a distribution of turbulent intensity in the autoclave;
    modifying the autoclave configuration with hardware changes to the autoclave to alter the airflow patterns in the autoclave,
    wherein modifying the autoclave configuration comprises modifying the autoclave configuration by adding a diffusion screen at an air inlet, the diffusion screen comprising one of a rectangular screen grid and a polygonal grid,
    wherein the diffusion screen grid has a perimeter to depth ratio of about 1.5 to 1 to about 2:1;
    modeling the modified autoclave configuration to produce a model of airflow patterns in the autoclave, modified temperature throughout the autoclave, and the modified distribution of turbulent intensity in the autoclave;
    modeling the modified autoclave configuration with parts to be cured in the modified autoclave configuration to determine an arrangement of parts that maximizes the number of parts in the autoclave that meet predetermined cured properties of the parts; and
    validating the model of airflow patterns using a numerical design of experiment (DOE) technique.

2. The method in accordance with claim 1, wherein determining process parameters comprise determining process parameters of the autoclave wherein the parameters include at least one of autoclave diameter, autoclave length, air inlet diameter, inlet flow rated, inlet velocity, operating pressure, and air temperature.

3. The method in accordance with claim 1, wherein modifying the autoclave configuration comprises modifying the autoclave configuration with hardware changes including at least one of adding a diffusion screen at an air inlet, adding baffles in the autoclave, changing tool configurations, adding insulation between a part and a tool, and changing fan speed.

4. The method in accordance with claim 1, wherein the DOE technique comprises positioning a plurality of metal blocks at various locations inside the autoclave, each metal block comprising an attached thermocouple to monitor the temperature of the metal block.

5. The method in accordance with claim 1, further comprising validating the arrangement of parts using a DOE technique.

6. The method in accordance with claim 5, wherein the DOE comprises positioning a plurality of parts at various locations inside the autoclave, running a cure cycle, and monitoring the temperature of each part.

7. The method in accordance with claim 1 wherein the parts comprise polymer matrix composite parts.

8. A method of optimizing an autoclave volume utilization, said method comprises:
    determining process parameters of an autoclave;
    modeling an autoclave configuration to determine airflow patterns in the autoclave, temperature variation throughout the autoclave, and a distribution of turbulent intensity in the autoclave;

modifying the autoclave configuration by positioning a diffusion screen in the autoclave to alter the airflow patterns in the autoclave,
wherein the diffusion screen comprises one of a rectangular screen grid and a polygonal screen grid, and
wherein the diffusion screen grid has a perimeter to depth ratio of about 1.5 to 1 to about 2:1;
modeling the modified autoclave configuration to produce a model of airflow patterns in the autoclave, modified temperature variation throughout the autoclave, and the modified distribution of turbulent intensity in the autoclave;
modeling the modified autoclave configuration with parts to be cured in the modified autoclave configuration to determine an arrangement of parts that maximizes the number of parts in the autoclave that meet predetermined cured properties of the parts; and
validating the arrangement of parts using a DOE technique.

9. The method in accordance with claim 8, wherein determining process parameters comprise determining process parameters of the autoclave wherein the parameters include at least one of autoclave diameter, autoclave length, air inlet diameter, inlet flow rated, inlet velocity, operating pressure, and air temperature.

10. The method in accordance with claim 8, wherein modifying the autoclave configuration further comprises modifying the autoclave configuration with hardware changes including at least one of adding baffles in the autoclave, changing tool configurations, adding insulation between a part and a tool, and changing fan speed.

11. The method in accordance with claim 8, further comprising validating the model of airflow patterns using a numerical design of experiment (DOE) technique.

12. The method in accordance with claim 11, wherein the DOE technique comprises positioning a plurality of metal blocks at various locations inside the autoclave, each metal block comprising an attached thermocouple to monitor the temperature of the metal block.

13. The method in accordance with claim 8, wherein the DOE comprises positioning a plurality of parts at various locations inside the autoclave, running a cure cycle, and monitoring the temperature of each part.

14. The method in accordance with claim 8 wherein the parts comprise polymer matrix composite parts.

* * * * *